Mar. 20, 1923.
J. B. BARTHOLOMEW
MOTOR CULTIVATOR
Filed Mar. 14, 1917
1,449,138
4 sheets-sheet 1
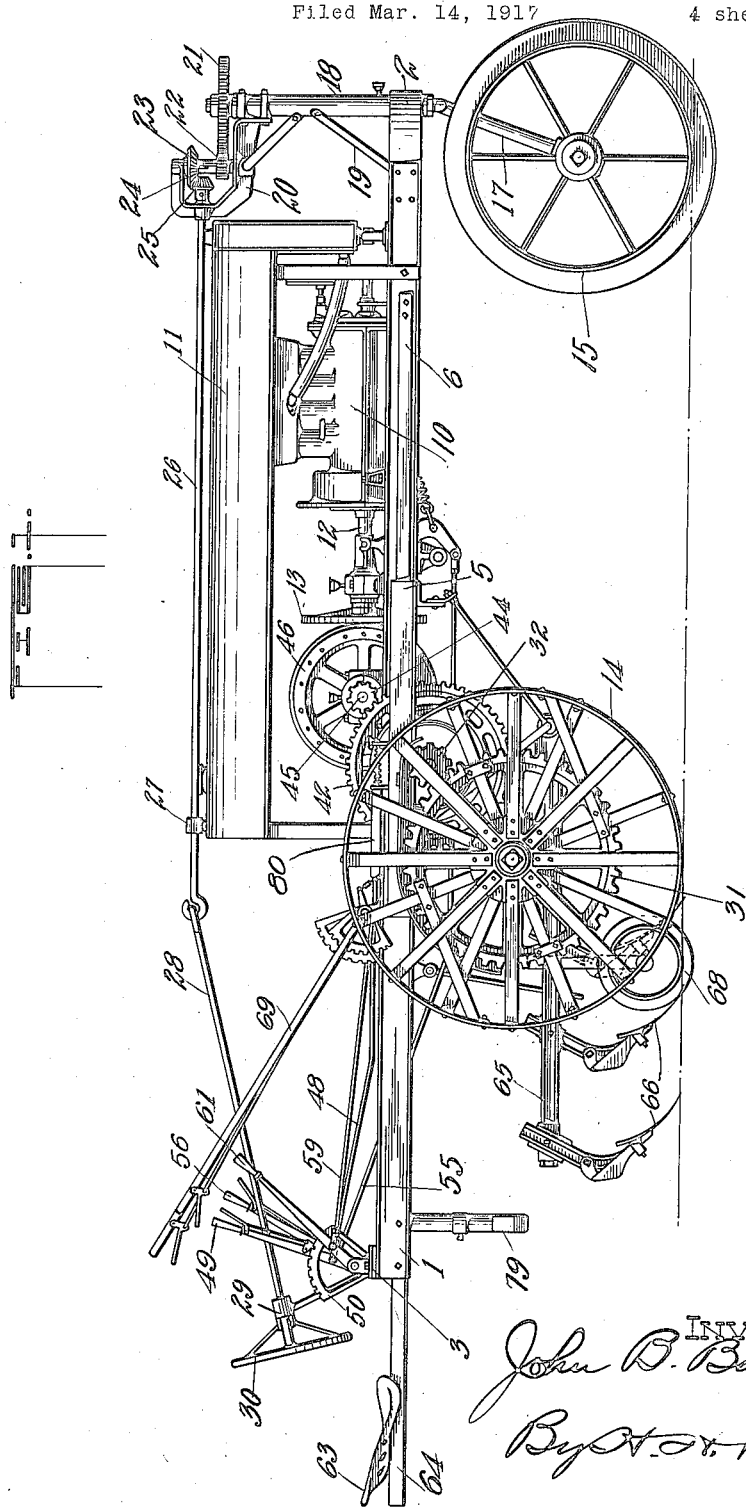
INVENTOR
John B. Bartholomew
By H. O. Blair
ATTY

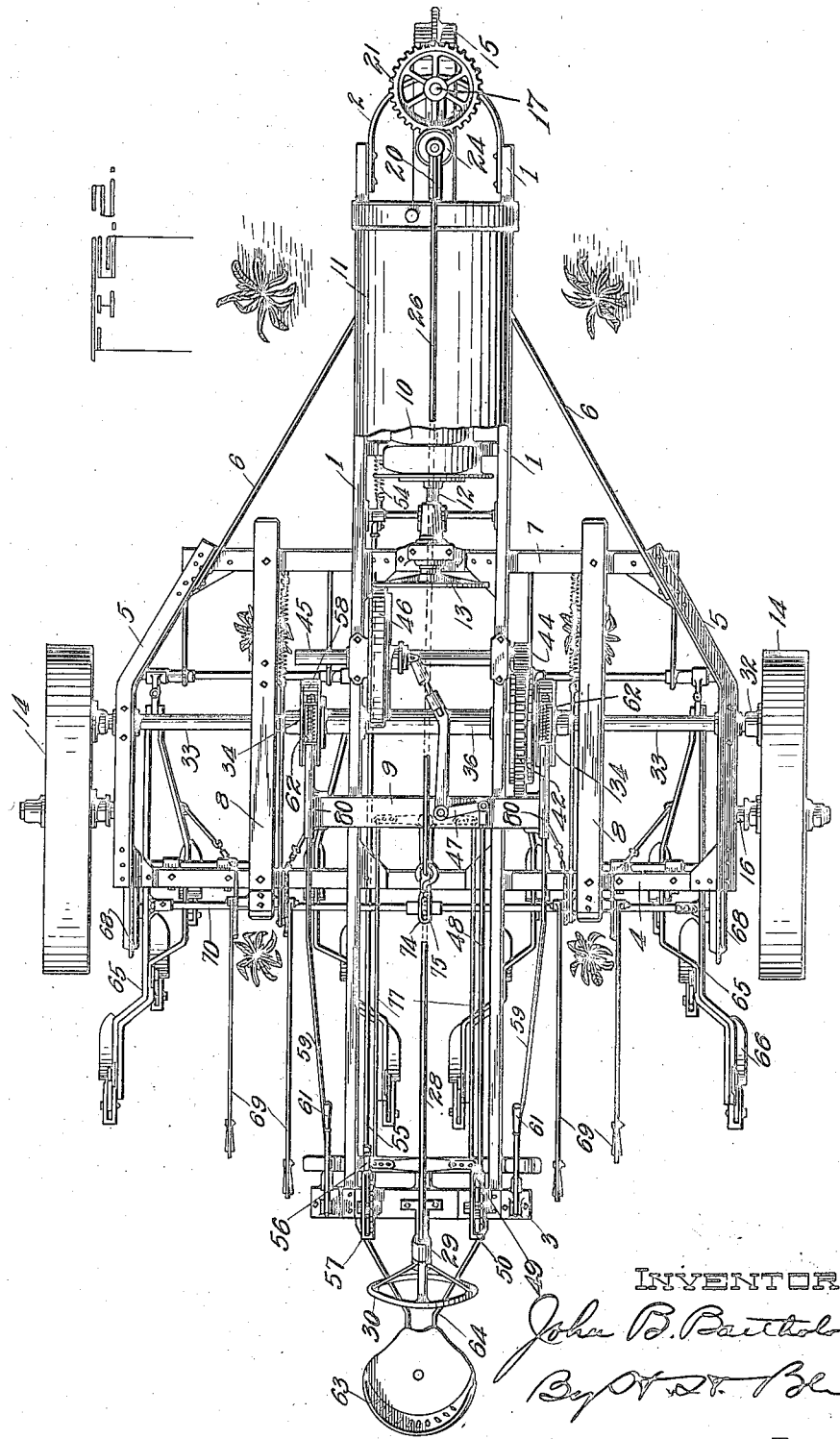

Mar. 20, 1923.
J. B. BARTHOLOMEW
MOTOR CULTIVATOR
Filed Mar. 14, 1917
1,449,138
4 sheets-sheet 3
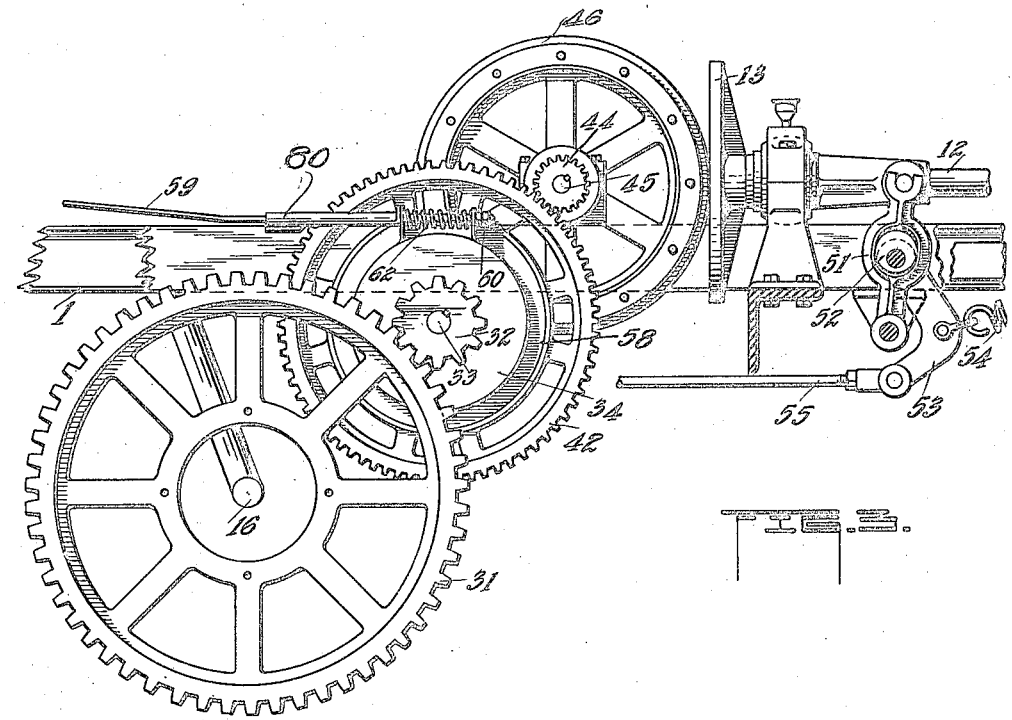
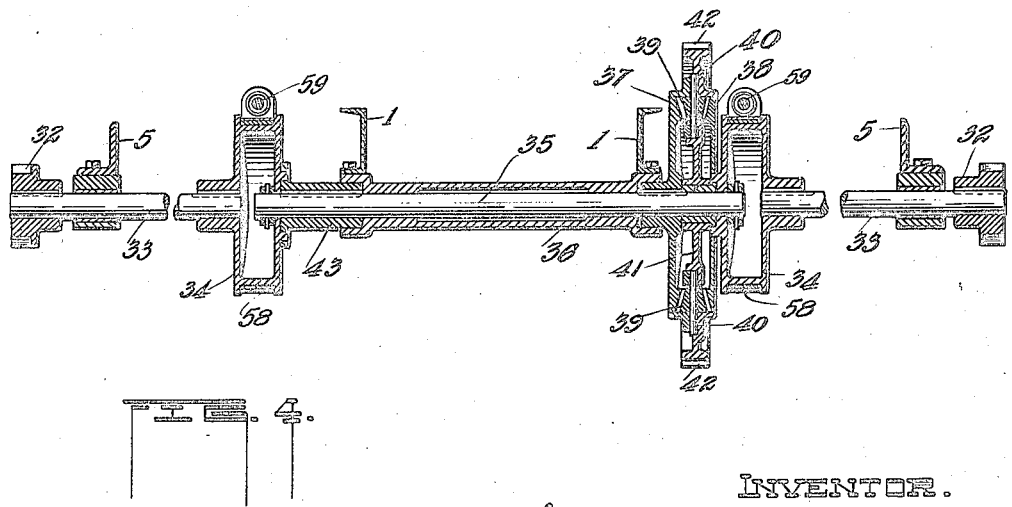
INVENTOR.
John B. Bartholomew
By H. H. Bliss
ATTY

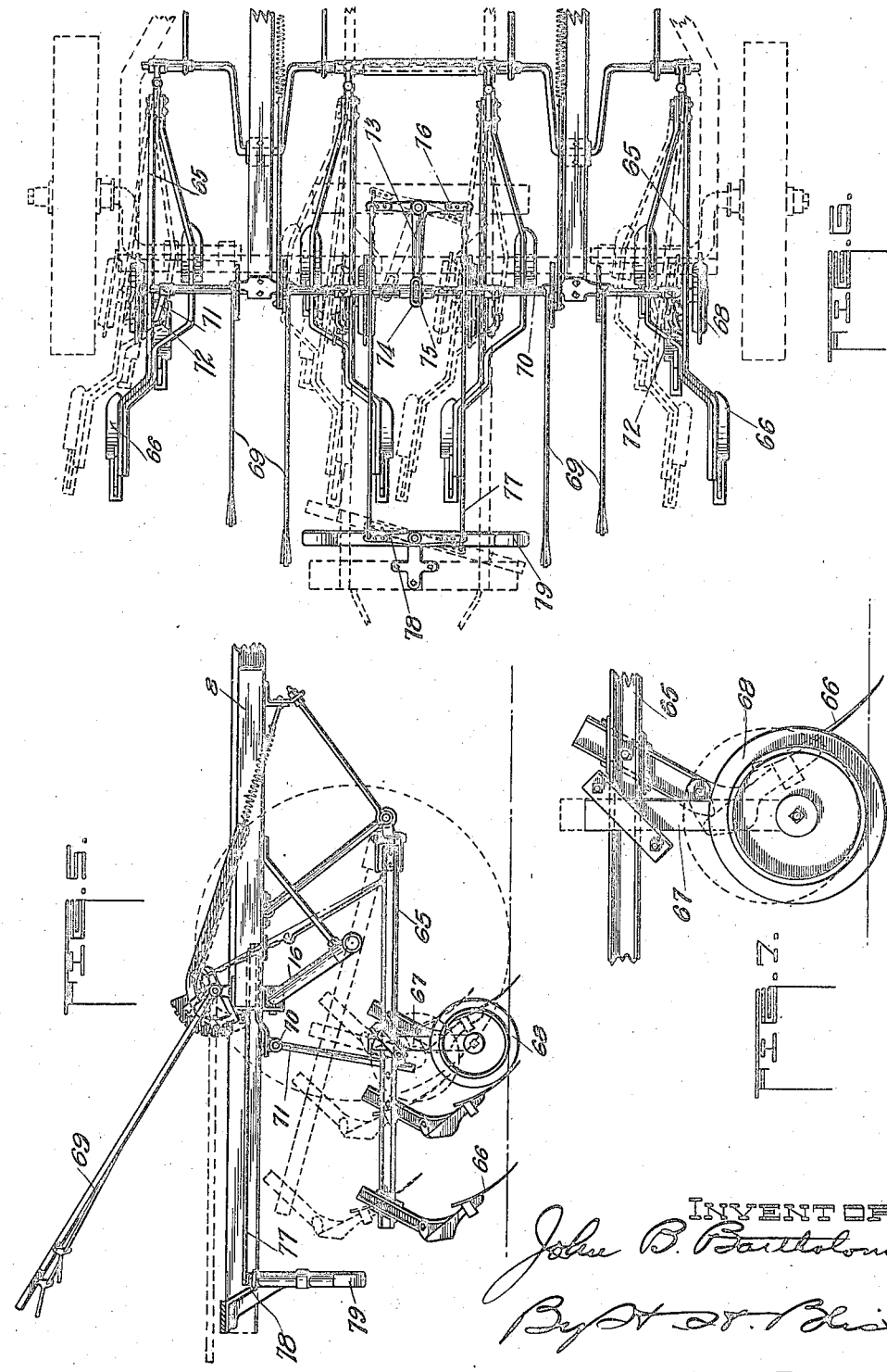

Patented Mar. 20, 1923.

1,449,138

UNITED STATES PATENT OFFICE.

JOHN B. BARTHOLOMEW, OF PEORIA, ILLINOIS, ASSIGNOR TO AVERY COMPANY, OF PEORIA, ILLINOIS, A CORPORATION OF ILLINOIS.

MOTOR CULTIVATOR.

Application filed March 14, 1917. Serial No. 154,820.

*To all whom it may concern:*

Be it known that I, JOHN B. BARTHOLOMEW, a citizen of the United States, a resident of Peoria, in the county of Peoria and State of Illinois, have invented new and useful Improvements in Motor Cultivators, of which the following is a specification.

This invention has reference to motor cultivators, and has for one of its objects to provide a motor propelled machine adapted to cultivate two rows of corn, cane, etc., at one time, and having two driving wheels which straddle two rows of corn, cane, etc., and a single steering wheel adapted to travel in between the two rows of corn, cane, etc., said steering wheel being under the control of the operator, and yet adapted to act as a caster wheel when one of the driving wheels is locked for turning the machine.

The invention has for a further object to provide a motor cultivator with two driving wheels arranged to straddle two rows of corn, and a single steering wheel adapted to run in between the said two rows of corn, and a brake and lever mechanism for each driving wheel, whereby, one or the other may be locked, such locked wheel acting as the pivot on which the machine may turn.

The invention has for a further object to provide a variable speed driving means, between the motor and the driving wheels, and means for controlling the same, whereby when the corn is small the machine may be propelled slowly, and when the corn is large, the machine may be propelled faster.

A further object of the invention is to provide in a motor propelled cultivator, gauge wheels adjustably supported in connection with the shovel beams, whereby the depth the shovels enter the ground may be predetermined, enabling the operator to devote most of his time to the steering of the machine.

That the invention may be more fully understood, reference is had to the accompanying drawings, forming a part of this specification, in which:

Figure 1 is a side elevation of my motor cultivator;

Figure 2 is a plan view, parts broken away;

Figure 3 is a side elevation, showing in detail the driving gearing between the motor and driving wheels;

Figure 4 is a cross-section showing in detail the compensating gear and friction brakes, through which power is transmitted from the motor to the driving wheels;

Figure 5 is a side elevation showing the cultivator mechanism and controlling means;

Figure 6 is a plan view of the mechanism shown in Figure 5, and

Figure 7 is a detail view showing the supporting and adjusting means for the gauge wheels, associated with the cultivator shovels.

Like characters of reference denote corresponding parts throughout the figures.

*The frame:*—The frame includes the parallel spaced channel beams 1, 1, connected at their forward ends by the curved strap or bar 2, and at their rear ends by the crossbar 3; also, the triangular shaped frame, including the parts 4, 5, 5, 6, 6, 7, 8, 8, and 9. The frame parts 1, 1 constitute the main supporting frame, carrying the gasoline engine or motor, and those portions of the frame included with the triangular shaped structure, are supported from the beams 1, 1, and constitute the support for the cultivator beams and shovels.

*The motor:*—The motor is designated 10, being preferably a gasoline engine of any suitable construction, and mounted on the beams 1, 1, in any suitable manner. The engine, as well as certain parts operated thereby, is covered by the housing or hood 11 mounted on the beams 1, 1. The driving shaft 12 of the engine has connected thereto the friction driving wheel or disc 13.

*Traction, propelling and steering means:*— The machine is mounted on the two driving wheels 14, 14, and the single centrally disposed steering wheel 15. The driving wheels 14, 14 are loosely journaled on shafts 16, which are secured to the frame parts 5, and the steering wheel 15 is loosely journaled on the horizontal portion of a vertically disposed shaft 17. This shaft passes up through and has a bearing in a tubular post or sleeve 18, secured to the curved strap or bar 2 and suitably braced from the beams 1, 1 by brace 19. Suitably secured to and braced from the post or sleeve 18, is a bracket 20. On the upper end of the shaft 17 is a gear wheel 21 and meshing with said gear wheel, is a pinion 22 carried on one end of a short vertical shaft 23 journaled in the bracket 20, and on the other end of said shaft 23 is carried a bevel pinion 24 meshing with a bevel pinion 25 on the forward end of a longitudinally disposed shaft 26, the front end of which is journaled in the bracket 20, and the rear end having a bearing in and passing through a collar 27 secured to the housing or hood 11. Having a loose coupling or flexible connection with the rear end of the shaft 26, is a shaft extension 28, the rear end of which passes through and has a bearing in a bracket 29 mounted on the cross-bar 3, and 30 designates an operator's wheel on the shaft 28 which enables him to have full control of the steering wheel 15 at all times.

Secured to each driving wheel 14 is a driving gear wheel 31, and in mesh with the teeth of said gear wheels 31, and adapted to impart movement thereto are driving pinions 32 secured on the outer ends of short shaft sections 33, journaled in bearing secured to the frame parts 5, 5, and their inner ends keyed or otherwise suitably secured to drums 34 constituting parts of friction brakes, to be further described. These drums are also carried on the opposite ends of a central shaft section 35 journaled in an elongated sleeve bearing 36 connected at its opposite ends to the beams 1, 1. A compensating gear mechanism is carried on one end of the shaft section 35, and includes the matching bevel gear wheels 37 and 38; the former keyed or otherwise suitably secured to the shaft section 35 and the latter suitably secured to the hub of the adjacent drum 34; also the bevel pinions 39 in mesh with the teeth of the matching bevel gear wheels 37 and 38, and carried on radially disposed spindles 40 secured at their inner ends to a hub or plate 41 adapted to revolve loosely on the shaft section 35, between the bevel gear wheels 37 and 38, and keyed or otherwise suitably secured to the spindles 40 is a gear wheel 42, completing the compensating gear mechanism. On the opposite end of the shaft section 35 is keyed or otherwise suitably secured a sleeve 43, and to the outer end of said sleeve is suitably secured the hub of the drum 34 adjacent thereto.

The gear wheel 42 is in mesh with a pinion 44 secured on one end of an operating shaft 45 journaled in bearings secured to the beams 1, 1, the intermediate portion of said shaft being preferably square, see Figure 2, and slidable on the square portion of said shaft is a friction driven wheel 46. This wheel 46 may be slid on the shaft 45 by means of the bell-crank lever 47 fulcrumed on the frame part 9. One end of said lever has a flexible connection with the hub of the wheel 46, and to the opposite end of said lever is connected the inner end of a rod 48 which extends back to the rear end of the machine and is connected to a lever 49, having the usual detent and operating means, associated with a toothed segment 50 secured to the frame part 3.

The peripheral surface of the wheel 46 is adapted to have an impinging frictional relation with the face of the driving disc 13, and when in such relation the speed at which the shaft 45 may be driven, is determined by the position of the wheel 46 on the shaft 45, regulated and controlled by the lever 49, bell-crank lever 47 and connections described. The shaft 12 and disc 13 are regulated and controlled by a well known means, including the pivoted yoke 51; the eccentric 52; lever 53 and spring 54; rod 55; lever 56, and associated detent and operating means and toothed segment 57.

The friction brakes, the drums 34 of which have been described, also include the straps 58 which encircle said drums, see Figs. 3 and 4. Passing through the free ends of said straps are rods 59, on one end of which are lock nuts 60, and the opposite ends of said rods are connected with levers 61 fulcrumed on the frame part 3. The straps 58 are normally maintained in a loose or free relation with the peripheries of the drums 34, by means of springs 62 coiled on the rods 59 and bearing between the free ends of said straps, see Fig. 3. To cause the straps 58 to grip the peripheral surfaces of the drums to lock either of the shaft sections 33 against rotation, the operator will draw the levers 61 backward, which will impart a similar movement to the rods 59, against the tension of the springs 62, which, when the levers 61 are released, will expand and release the straps 58 from impinging relation with the drums.

The operator's seat 63 is secured to straps or bars 64, which in turn are secured to the frame part 3, and it will be observed from the drawings, that the wheel 30, controlling the steering wheel 15, and levers 49, 56 and 61, are each located in reaching distance, giving the operator complete control of the parts heretofore described.

*Cultivating mechanism:*—The cultivating mechanism is best seen in Figures 5, 6 and 7, and in a large part said mechanism is not unlike a well known make of cultivator, except that in connection with the traction means, the cultivator beams 65 are arranged in pairs with cultivating shovels 66, so that the same will straddle two rows of row crops, such as corn, cane, etc., with the driving wheels 14 also straddling the two rows, and with the steering wheel 15 in between the two rows. To the beams 65 are adjustably secured the supports 67 on the lower ends of which are journaled gauge wheels 68. The cultivator beams 65, as will be seen, are suitably hung or suspended from the frame parts 7 and 8, and the beams and shovels may be raised and lowered through the levers 69 and connections. The beams and shovels may be shifted sidewise, as shown in dotted lines in Figure 6, through and by means of mechanism, including the rod 70; the rods 71 depending therefrom and engaging straps 72 secured to the beams; the lever 73 having the yoke 74 in which operates the pin 75 secured to rod 70; said lever fulcrumed on the frame part 9 and having opposite arm extensions 76 to which are connected the forward ends of rods 77, which, at their rear ends are connected with opposite ends of a lever 78 connected with a pivotally supported foot operated gang shifting device 79.

From the foregoing description, it is obvious that I have combined in a motor cultivator, adapted to cultivate two rows of crops such as corn, cane, etc., a steering mechanism which will enable the operator to turn very quickly without destroying any of the crop by running over it with the wheels, and providing a two row cultivating machine capable of being turned so short that the next two rows can be cultivated; understanding, that to use a two row cultivator, it is necessary to plow corn that is planted with a two row planter, so that the spacing of the rows will be at all times uniform.

The steering wheel is operated through a reduction gear, from the hand wheel 30, and such reduction in the gearing is for the purpose of giving delicate steering control to the operator, it being a rather delicate operation to steer a machine of this sort under operating conditions on an accurate straightforward line, such as straddling two rows of a crop.

By means of either of the levers 61 and connections, the operator may actuate either of the friction brakes, locking one or the other of the driving wheels 14, the locked wheel acting as the pivot on which the machine will turn, in which case, the steering wheel 15 will act as a caster wheel, until the machine arrives at the point where straight-ahead movement is desired, when the operator will release the lever 61, and control the steering wheel from the hand wheel 30.

The advantage of the variable speed gearing 13 and 46 for operating the driving wheels 14, is in being able to run the machine as slow as need be when the corn is small, so as not to cover it with dirt, and run it faster as the corn grows larger, when the amount of dirt thrown does not matter so much, and the cultivating may be done quickly.

In horse drawn cultivators, the operator experiences little or no difficulty in regulating the depth the shovels will enter the ground, as the animals soon learn to follow the rows, and the operator need give but little attention to steering the machine; but in a motor operated cultivator, the operator must give close attention to the steering of the machine, and therefore, cannot devote so much time to the depth the shovels will enter the ground. To meet this condition, I have provided the gauge-wheels 68 and supports therefor, which may be adjusted vertically on the shovel beams. These gauge-wheels will follow the unevenness of the ground and will insure that the shovels penetrate the ground at a predetermined depth, even though the ground be quite uneven.

When the brakes 58 are applied the rear end of each strap is held against the spring 62 by a bearing 80 (Fig. 2) which is fixed to the frame and encircles and guides the forward part of the rod 59. Friction contact of the disk 13 with the friction driven wheel 46 is or may be maintained by the said spring 54.

It will be understood that the driven friction wheel 46 may be shifted from the position shown in Fig. 2 across the axis of the disk 13 and to the right hand side thereof, thereby reversing the direction of movement of the power transmitting gearing. The rearward movement of the rod 55 will serve to move slightly forward the disk 13 and disconnect the friction gear and stop the machine without stopping the motor. The rods 71 may be adjusted on the cross rod 70 so as to vary the initial positions of the various gangs as may be desired. Other means than that shown may be provided for laterally adjusting the gangs, the invention not being limited to the use of the rods 70 and 71. The arrangement of the traction wheels and the steering caster wheel at substantially the three points of an equilateral triangle facilitates the automatic action of the caster wheel in turning when one of the traction wheels is stopped or retarded and the other traction wheel continues to propel the machine. This last mentioned means for steering is employed when quick or sharp turns are required, the manual steering wheel 30 being used under normal conditions when the rows of plants are more nearly straight. When the caster wheel turns automatically as above described the operator may assist such turning by the manual steering wheel 30 or may leave the latter wheel free to be turned by the action of the caster wheel.

What I claim is:

The combination of the frame having the elongated central longitudinal element and the transversely positioned elongated element, the traction wheels on the transverse frame element and spaced to travel on the outer sides of two adjacent corn rows, a normally castering wheel at the front end of the longitudinal frame element and positioned to normally travel on the central longitudinal line between the two corn rows straddled by the traction wheels, cultivator tools supported on the frame, a driver's seat on the rear end of the frame behind the traction wheels and positioned to have the tools, the adjacent plants and the path in front of the machine all visible by the driver when in the seat, the engine on the frame, power transmission gearing connecting the engine with the traction wheels and including manually controlled means whereby the frame may be optionally turned around either traction wheel to simultaneously move the tools toward and from the corn rows and also move laterally the front end of the frame, bodily, together with the castering wheel, a hand wheel, and a train of power transmission devices permanently connecting the hand wheel operatively to the castering wheel, said hand wheel and said castering wheel being reciprocally responsive in movements at all times.

JOHN B. BARTHOLOMEW.